United States Patent [19]

Dunbar

[11] Patent Number: 5,777,689

[45] Date of Patent: Jul. 7, 1998

[54] METHOD AND APPARATUS FOR VIDEO SIGNAL SHARPENING

[75] Inventor: Brion Dunbar, Grass Valley, Calif.

[73] Assignee: Tektronix, Inc., Wilsonville, Oreg.

[21] Appl. No.: 630,319

[22] Filed: Apr. 10, 1996

[51] Int. Cl.[6] .................................................. H04N 5/208
[52] U.S. Cl. .................................................. 348/625; 348/627
[58] Field of Search .................................. 348/618, 622, 348/623, 625, 627, 630; 382/266, 269; H04N 5/208

[56] References Cited

U.S. PATENT DOCUMENTS

| | | |
|---|---|---|
| 4,268,861 | 5/1981 | Schreiber et al. .................. 348/391 |
| 4,561,022 | 12/1985 | Bayer ................................... 348/622 |
| 4,825,297 | 4/1989 | Fuchsberger et al. .............. 348/630 |
| 5,237,402 | 8/1993 | Desbon et al. ..................... 348/607 |

*Primary Examiner*—John K. Peng
*Assistant Examiner*—Jeffrey S. Murrell
*Attorney, Agent, or Firm*—Francis I. Gray

[57] ABSTRACT

A video sharpening circuit for improving video signal detail or providing a unique visual effect extracts the high frequency portion from an input video signal. The high frequency portion is then variably amplified and added to the input video signal or to a reference video signal. The resulting output video signal has the high frequency detail restored to produce an aesthetically pleasing effect.

8 Claims, 1 Drawing Sheet

METHOD AND APPARATUS FOR VIDEO SIGNAL SHARPENING

BACKGROUND OF THE INVENTION

The present invention relates to processing of video signals, and more particularly to video sharpening of a video signal using linear unsharp masking to accentuate high frequencies in a image represented by the video signal.

In many video signal processing applications information and detail is lost, particularly at edges of the image represented by the video signal which has a large high frequency spectral component. Such processing applications include encoding/decoding of the video signal, i.e., converting the signal back and forth between composite and component formats, and anti-alias filtering. These processes affect the edges of the images particularly, i.e., the high frequency spectral component of the video signal, which results in blurring or diffusion of the edges. Further there is always a desire to achieve more varied video effects for intentionally distorting or otherwise altering the image in the video signal in a pleasing manner.

What is desired is video sharpening of a video signal to enhance edges of an image represented by the video signal to sharpen details and recover lost information, as well as to produce a new video effect.

SUMMARY OF THE INVENTION

Accordingly the present invention provides video sharpening of a video signal using linear unsharp masking to accentuate high frequencies in the video signal. The video signal is one-, two- or three-dimensionally filtered to produce a filtered video signal. The filtered video signal is subtracted from the input video signal to produce a difference video signal. The difference video signal is amplified by a gain factor, K, as a function of a desired degree of sharpness or in order to produce a desired video effect. The amplified difference signal is added either to the input video signal or to a reference video signal, such as a matte video signal. The resulting output video signal provides the image with enhanced edges or with a unique video effect at the edges.

The objects, advantages and other novel features of the present invention are apparent from the following detailed description when read in conjunction with the appended claims and attached drawing.

DESCRIPTION OF THE PREFERRED EMBODIMENT

Figure 1:
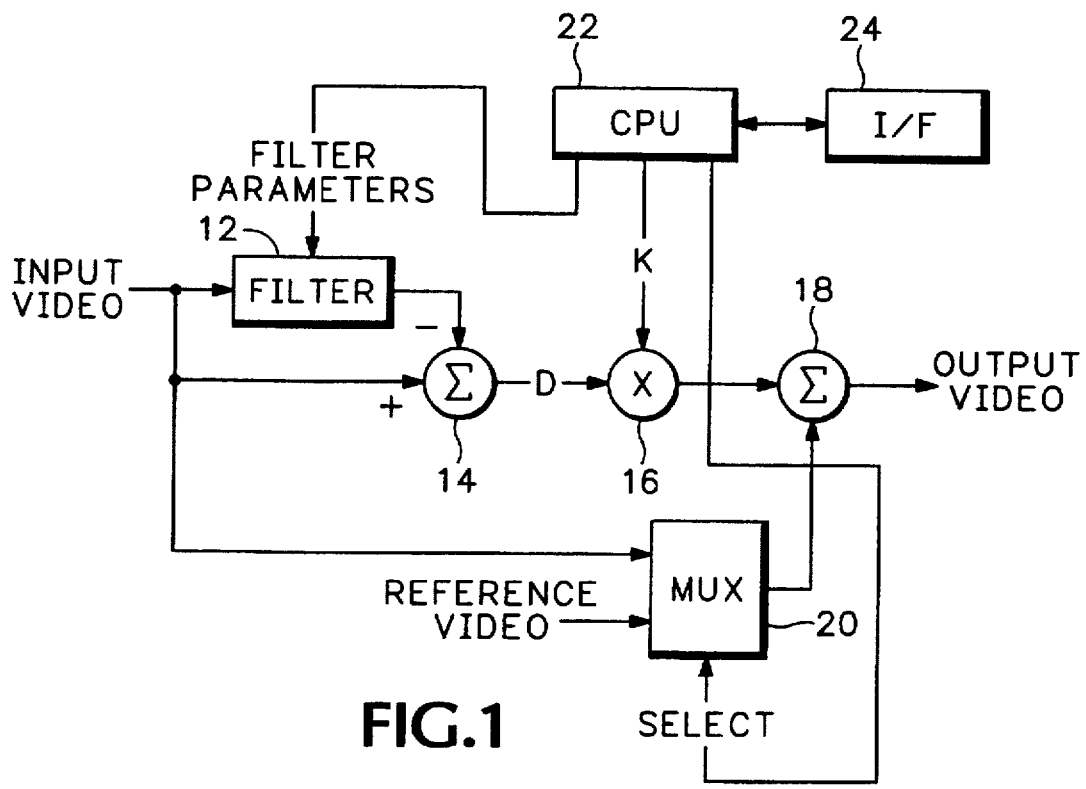
FIG. 1 is a block diagram view of a video sharpening circuit according to the present invention.
Figure 2:
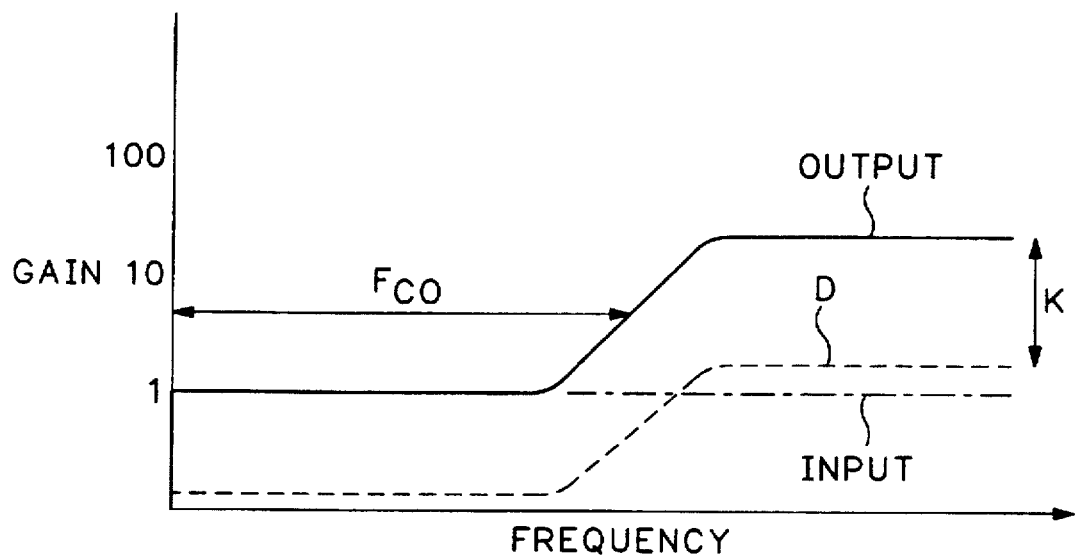
FIG. 2 is a spectral diagram illustrating the affect of video sharpening on the spectral content of the video signal according to the present invention.

Referring now to FIG. 1 a video sharpening circuit 10 is shown having a video signal, such as a luminance component video signal or a chrominance component signal, as an input video signal. The input video signal is applied to a variable filter 12, which may provide either one-, two- or three-dimensional lowpass filtering of the input video signal according to the selected filter parameters. The filtered video signal from the variable filter 12 is input together with the input video signal to a difference circuit 14, the output of which is a difference video signal, D, that contains only the spectral component above the cutoff frequency of the variable filter, as shown in FIG. 2. The difference video signal D is input to an amplifier 16, where it is amplified by a gain factor, K, to produce an amplified difference video signal. The amplified difference video signal is then input to a summation circuit 18 to produce an output video signal. Since the amplified difference video signal contains only the high frequency components of the input video signal, and since edges are affected by the high frequency components, or lack thereof, the output video signal is enhanced by the addition of the amplified difference video signal. If the value of K exceeds a certain value, the edge takes on a new appearance that produces a new video effect producing a sort of metallic look to the edges.

An optional multiplexer 20 may be inserted to receive the input video signal and a reference video signal, such as a matte video signal or a black video signal, and provide for addition to the amplified difference video signal in the adder 18 one or the other of the two video signals input as a function of a select command. The result is to produce a skeleton-like effect if the reference video signal is selected for output from the multiplexer 20, as the output video signal includes the constant video signal and the edges as reflected in the amplified difference video signal. The select command, the filter parameters and the gain factor are all determined by a central processing unit 22 as a function of operator input via an appropriate interface 24.

Thus the present invention provides for video sharpening by obtaining a difference signal that represents the high frequency component of an input video signal, amplifying the difference signal and adding the amplified difference signal back to the input video signal or a reference video signal.

What is claimed is:

1. A video sharpening circuit comprising:
   means for obtaining from an input video signal an enhanced high frequency portion of the input video signal; and
   first means for combining the enhanced high frequency portion with a desired video signal selected from the group consisting of the input video signal and a reference video signal to produce a sharpened video signal.

2. The video sharpening circuit as recited in claim 1 wherein the obtaining means comprises:
   means for variably filtering the input video signal to produce a lowpass filtered video signal; and
   second means for combining the lowpass filtered video signal with the input video signal to produce the enhanced high frequency portion.

3. The video sharpening circuit as recited in claim 2 wherein the second combining means comprises:
   means for subtracting the lowpass filtered video signal from the input video signal to produce a difference video signal; and
   means for variably amplifying the difference video signal to produce the enhanced high frequency portion.

4. The video sharpening circuit as recited in claim 1 further comprising means for selecting between the input video signal and the reference video signal to provide the desired video signal for input to the first combining means together with the enhanced high frequency portion.

5. A video sharpening method comprising the steps of:
   obtaining from an input video signal an enhanced high frequency portion of the input video signal; and
   combining the enhanced high frequency portion with a desired video signal selected from the group consisting of the input video signal and a reference video signal to produce a sharpened video signal.

6. The method as recited in claim 5 wherein the obtaining step comprises the steps of:

variably filtering the input video signal to produce a lowpass filtered video signal; and combining the lowpass filtered video signal with the input video signal to produce the enhanced high frequency portion.

7. The method as recited in claim 6 wherein the lowpass filtered video signal combining step comprises the steps of.

subtracting the lowpass filtered video signal from the input video signal to produce a difference video signal; and variably amplifying the difference video signal to produce the enhanced high frequency portion.

8. The method as recited in claim 5 further comprising the step of selecting between the input video signal and the reference video signal to provide the desired video signal for input to the enhanced high frequency portion combining step.

* * * * *